United States Statutory Invention Registration [19]

[11] Reg. Number: H748

Graham [43] Published: Mar. 6, 1990

[54] AIR BRAKE WITH COLLET LOCKED PUSH ROD AND EXCESSIVE FORCE REDUCER

[76] Inventor: John M. Graham, 930 Peninsula Ave. #205, San Mateo, Calif. 94403

[21] Appl. No.: 396,488

[22] Filed: Aug. 21, 1989

[51] Int. Cl.[4] ..... F01B 7/00

[52] U.S. Cl. ..... 92/63; 92/130 R; 92/130 A

*Primary Examiner*—Charles T. Jordan
*Assistant Examiner*—Michael J. Carone

[57] ABSTRACT

An air brake includes a service brake chamber which actuates a push rod. A collet brake chamber is partially defined by a collet brake diaphragm. A locking collet is mounted to the collet brake diaphragm and includes a bore through which the push rod passes. A collet brake spring biases the collet into a tapered collet hole to clamp the collet onto the push rod to prevent the movement of the push rod toward the brake off position. Application of pressure to the collet brake chamber overcomes the force of the collet brake spring and moves the collet away from the tapered collet hole to allow the push rod to move freely. Excessive force on brake drums, caused by cooling and contracting brake drums while parked, can be reduced by permitting the collet and push rod therewith to deflect when such excessive force occurs.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

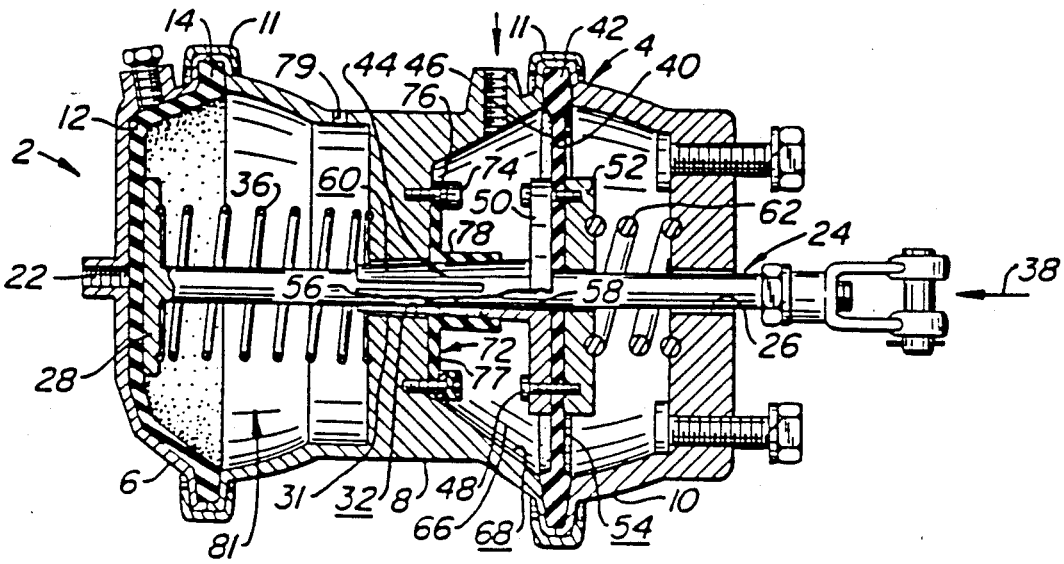

BEST AVAILABLE COPY

AIR BRAKE WITH COLLET LOCKED PUSH ROD AND EXCESSIVE FORCE REDUCER

BACKGROUND OF THE INVENTION

Trucks, as well as other large vehicles, generally use air brakes for stopping for both the tractor and the trailer. air brakes include a service brake chamber which drives a push rod into a brake on position when air is applied to the service brake chamber. For parking purposes, a dual chamber air brake is often used. These dual chambered brakes include both a service brake chamber, for applying the brakes during normal operation, and what is called a spring brake chamber. The spring brake chamber includes a relatively heavy spring connected to the push rod. The spring is compressed only when air from a spring brake line is applied to the spring brake chamber. When the air in the spring brake chamber is vented, the spring brake spring drives the push rod to a brake on position. Thus, when a truck is parked and the air in the brake chambers is vented, the service brake chamber no longer actuates the brakes but the spring brake spring pushes the push rod into a spring brake on position thus applying the brakes.

Conventional dual chamber brakes can only be made so that the braking force applied by the spring brake spring is only about half of the braking force applied by the pressurization of the service brake chamber. This has made the use of the legal parking brake inadequate for emergency braking requirements, and has limited its effective usage to parking brake requirements only. The rationale for this seemingly defective design is that the spring brake chamber may be vented while the service brake chamber is pressurized; when this occurs the total force on the brake is greater than that of the service brake alone. If the spring brake spring were made large enough to equal the force resulting from the pressurization of the service brake chamber, the force applied to the brakes would be about *double* that applied by the service brakes alone. This excess loading may lead to cracked drums and other premature failure. Thus the spring brake force is necessarily and commonly limited to about 50% of the service brake force. Recently there are means availableto prevent the compounding of the service and parking brakes forces. See U.S. Pat. No. 4,407,548.

At present, there are no statutes which provide for emergency brakes for air braked vehicles. There are statutes which govern parking brakes, and air braked vehicles must have them. The USA, Asia and Europe have accepted the spring brake for parking brake requirements only and have not yet specified it for any emergency brake requirements. Since something is better than nothing, the trucking industry uses their legal parking brake for emergency situations because nothing else exists for them to use, if the service brakes fail when a vehicle is in motion. However, because of the limited stopping power of spring brakes, and since they are usually not used on all braked wheels, they are not effective replacements for the service brakes which are designed to stop a vehicle in motion.

The Bendix Corporation of Southfield, Mich. sells two models of air brakes, identified as DD-3 and SD-3 safety actuators, with mechanically locked push rods. The Bendix safety actuators include a number of rollers wedged by a spring between the push rod and an inclined collar ramp. During normal running conditions, that is when the spring brake line is pressurized, air pressure in the spring brake line pushes a piston against the rollers to move the rollers up the ramp so that the rollers move away from the push rod. When the spring brake line is vented, such as when parked, the piston returns allowing the rollers, under the influence of the spring, to be wedged against the collar ramp and the push rod; this locks the push rod in place.

When using the Bendix safety actuator, the brakes do not release by normal means. That is, people in the trucking industry are used to having the parking brakes release when the air pressure comes up. However, with the Bendix safety actuators, one cannot always release the parking brake unless an application of the service brake is also made. Also, application of the Bendix safety actuators requires that the vehicle's service brake bring the vehicle to a stop before their application. Therefore, the Bendix safety actuators are useable only for parking, not emergency purposes, if a vehicle's service brake is unable to stop the vehicle while moving. The Bendix actuator is complex, requires many precision machined parts and needs perfect seals. It is thus quite expensive. At present the only equipment of which applicant is aware using the DD-3 and SD-3 are GMC transit buses. These drawbacks may account for the limited acceptance the Bendix safety actuators have achieved.

International Transquip Industries, Inc. of Houston, Tex. sells an air activated mechanically held brake under the trademark Mini-Max. The brake is used with a conventional relay emergency valve for emergency application. For parking, serrations on the push rod are engaged by the serrated end of a piston to lock the push rod in place. this occurs when air pressure in the emergency tank is lost. Because of the loads and the environment encountered during use, it is expected that the serrated members would need to be made of expensive metals to achieve long life for this combination service and parking brake.

SUMMARY OF THE INVENTION

The present invention provides a pressurized fluid actuated brake, particularly useful as an air brake for trucks, which is simple and rugged in construction.

An air brake made according to the invention includes a service brake chamber and a collet brake chamber. When the service brake chamber is pressurized, a push rod is driven into a brake on position by the pressurized air. When the service brake chamber is vented, the push rod is biased to a brake off position by a return spring. The service brake chamber is partially defined by a service brake diaphragm having an outer surface against which an enlarged, flattened end of the push rod presses.

The housing also includes a collet brake chamber partially defined by a collet brake diaphragm. A locking collet, having a bore through which a portion of the push rod passes, is mounted to the collet brake diaphragm. A collet brake spring biases the collet into a tapered collet hole defined by the housing. This clamps the radially flexible collet fingers against the push rod to halt movement of the push rod toward the brake off position. Application of pressure to the collet brake chamber overcomes the force of the collet brake spring and moves the collet away from the tapered collet hole; this allows the push rod to move freely. The collet brake chamber is pressurized by what is sometimes called the spring brake supply line of the air supply line in conventional air brake systems; this same line will sometimes be called the collet brake supply line in this application.

The locking collet can be mechanically secured in position away from the tapered collet hole and against the force of the collet brake spring by the user. This permits the user to mechanically release the collet from the push rod when the vehicle is stationary. It also permits the user to prevent the collet from locking the push rod in place during operation of the truck.

The primary advantage of the collet brake of the present invention is that during emergency braking 100% of the service brake braking force is available for stopping the vehicle. This is quite an improvement over conventional spring brakes which apply only about 50% of the service brake braking force.

Another important advantage is that the braking force applied by the collet is mechanical. that is, the collet brake spring applies a mechanical locking force which locks the collet onto the push rod, thus maintaining the brakes in position. Thus the present invention meets the current U.S. Motor Carrier Safety Regulation for parking brake systems, because when parked, the collet brake spring and collet holds the brake in position using mechanical energy, as opposed to hydraulic, pneumatic, or electrical energy which are illegal for this purpose.

Another advantage of the present invention is that regardless of whether or not the collet is locked on the push rod, the service brakes can always be applied. The force on the push rod applied to the service brake chamber is sufficient to overcome the collet brake spring thus moving the collet out of engagement with the collet hole; once this occurs, the push rod slides within the collet bore to move to the brake applied position.

A further advantage of the present invention arises out of the simplistic and economical nature of the collet locking mechanism used to secure the push rod in place. Once the collet is locked in place, the force o f the pushrod tends to increase the wedging force applied to the collet thus compounding the wedging force applied by the collet brake spring. Further, the collet is self-aligning within the tapered collet hole to reduce problems caused by cocking of the push rod. Also, the collet can engage a substantial surface area of the push rod so the push rod can be locked within the collet at relatively low surface pressures on the push rod. This reduces surface deformation and wear and therefore promotes smooth operation and long life.

One problem with collet locked brakes results from heat build-up in the brake drums. This typically occurs after a vehicle has traveled down a long hill using the brakes a substantial amount. It is common for the driver to stop at the bottom of the hill for a break and to permit the brakes to cool. However, the heat build-up causes the drums to expand so that when the brakes are applied and locked into place when the vehicle is parked, upon cooling the brake drums tend to contract increasing the force applied to the drums by the brake shoes. This increase in force can be enough to crack the brake drums. To prevent this from occurring, the portion of the brake housing defining the tapered collet hole is axially movable within the housing and is biased in the brake on direction. That is, the collet hole portion of the brake housing is biased axially in the same axial direction which the push rod moves when the brake is applied. The force of the biasing element, typically Belleview springs, is chosen so that it deflects when an excessive axial force is exerted on the push rod. This permits the collet hole portion, and the collet and push rod therewith, to move in the brake off direction to reduce the excessive force on the brake drum and thus reduce the excessive force on the push rod.

To deactivate conventional spring brakes, the air pressure applied to the spring brake chamber must be sufficient to overcome its heavy duty spring. Thus, at present, it takes time for a tractor's air pressure producing system to generate enough pressure to release the spring brake before a tractor or a trailer can be moved. With the present invention, however, the vehicle can be moved sooner than with conventional spring brakes because first, the collet needs only to be moved a short distance to release the push rod, thus allowing the push rod biasing spring to remove the brakes.

The cost of conventional spring brakes is so high that they are only required on one axle of a three axle tractor further reducing the available braking force during emergencies and while parked. An air brake made according to the invention should be able to be manufactured at about the same price or less than commercially available spring brakes. Therefore, a significant cost saving may be realized because fewer units need to be used to obtain equal or greater performance when compared with these conventional brakes. Also, an air brake made according to the invention can be attached to the vehicle's service brake chamber an service brake supply lines in the same manner as conventional dual chambered service and spring brakes to reduce installation problems.

Other features and advantages of the present invention will appear from the following description in which the preferred embodiments have been set forth in detail in conjunction with the accompanying drawings.

BRIEF DESCRIPTION OF THE DRAWINGS

FIG. is a side cross-sectional view of a first embodiment of an air brake made according to the invention with the push rod in the brake off position and the push rod free.

DETAILED DESCRIPTION OF THE PREFERRED EMBODIMENTS

Figure 1:
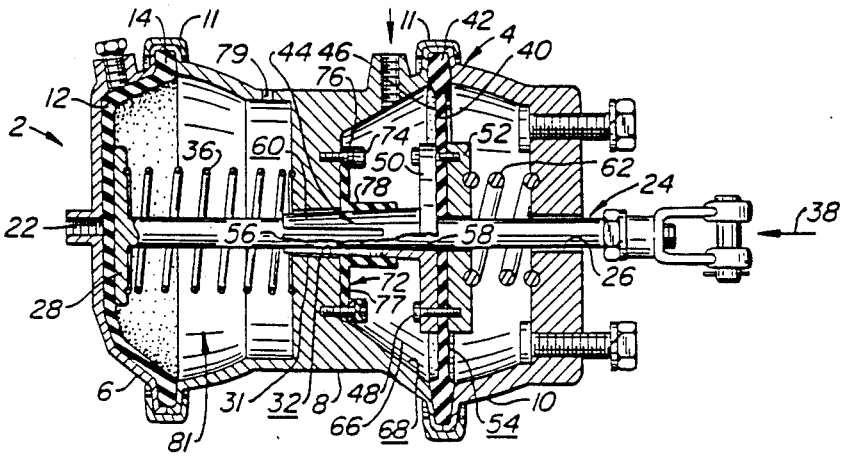
Figure 2:
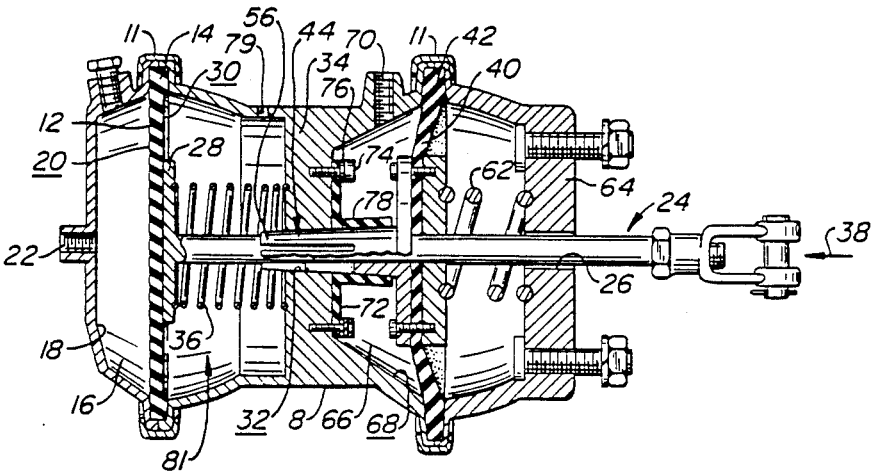
FIG. 2 shows the air brake of FIG. 1 but with the push rod in the brake on position and the push rod locked in position.

Turning now to FIGS. 1 and 2 an air brake 2 includes a housing 4 made up of first, second and third housing portions 6, 8 and 10 secured to one another by clamps 11. A service brake diaphragm 12 is mounted at its peripheral edge 14 between housing portions 6 and 8 to define a service brake chamber 16 between the interior surface 18 of portion 6 and the diaphragm surface 20. A service brake line port 22 allows fluid communication between a service brake line, not shown, and service brake chamber 16.

A push rod 24 passes through an opening 26 in third housing portion 10. Push rod 24 has an enlarged outer end 28 positioned adjacent a surface 30 of diaphragm 12 opposite diaphragm surface 20. Push rod 24 passes through a conical opening 31, defined by a conical surface 32, in a bulkhead 34 of second housing portion 8. A return spring 36 is mounted between outer end 28 and bulkhead 34 to bias push rod 24 in the direction of arrow 38, that is towards the brake off position of FIG. 1. Pressurization of service brake chamber 16 overcomes the relatively weak biasing force of the return spring 36 to force push rod 24 in a direction opposite arrow 38 towards the brake on position of FIG. 2.

A collet brake diaphragm 40 is secured at its peripheral edge 42 between second and third housing section and 10. A collet 44 is mounted to a surface 46 of diaphragm 40 by a number of screws 48 passing through a circular mounting flange 50 at one end of collet 44, diaphragm 40 and into a mounting ring 52 positioned adjacent the opposite surface 54 of diaphragm 40. Diaphragm 40 supports collet 44 for limited axial movement parallel to push rod 24 and within conical opening 31.

Collet 44 also includes a number of resilient fingers 56 surrounding a bore 58. The outer surface 60 of fingers 56 is tapered at an angle complementary with the tape of conical opening 32. A collet brake locking spring 62 is mounted between the end 64 of third housing portion 10 and mounting ring 52. Locking spring 62 normally biases collet 44 in the direction of arrow 38 so that outer surface 60 is forced against conical surface 32 thus forcing fingers 56 against push rod 24 locking push rod 24 in place. Push rod 24 is released by applying air pressure into a collet brake chamber 66 defined generally between surface 46 of diaphragm 40 and an inner surface 68 of second housing portion 8. Pressurized air is introduced into chamber 66 through a collet brake port 70 which is coupled to a collet brake supply line not shown. The collet brake supply line corresponds to the spring brake supply line in conventional dual chamber air brake systems. Pressurized air is prevented from escaping between outer surface 60 and conical surface 32 by a generally cylindrical seal 72. Seal 72 is secured to bulkhead 34 by screws 74 passing through a ring retainer 76 and an annular lip portion 77 of seal 72. Pressurizing chamber 66 causes cylindrical portion 78 of seal 72 to press against collet 44 thus sealing chamber 66 while allowing sufficient axial movement of collet 44.

During normal driving, chamber 66 is pressurized so that push rod 24 is free to move. This condition is shown in FIG. 1. Applying pressurized air to port 22 drives push rod in the direction opposite arrow 38 to a brake applying or brake on position. A bleed ole 79 vents a region 81 behind diaphragm 12 to atmosphere. If it is desired to keep the brakes applied, collet brake chamber 66 is vented through port which allows locking spring 62 to force collet 44 against conical surface 32. This is he condition of FIG. 2. Once this occurs the pressure within service brake chamber 16 may be reduced. However, because of the frictional engagement between push rod 24 and collet 44, attempted movement of push rod 24 in the direction of arrow 38 tends to drive the collet further into conical surface 32 thus increasing the frictional engagement between the collet and the push rod. This effectively locks the push rod in place to keep the brakes applied.

If, however, chamber 66 were vented while push rod 24 was in the brake off position o f FIG. 1, collet 44 would tend to lock push rod 24 into place, that is in the brake off position. However, upon application of pressure to port 22, service brake chamber 16 becomes pressurized. The force against diaphragm 12 is made to be substantially greater than the force of locking spring 62 so that the application of this pressure to port 22 forces push rod 24 and collet 44 therewith towards the brake applied position, that is in the direction opposite arrow 38. Once collet 44 has moved slightly, the frictional force between the collet and the push rod is reduced sufficiently to allow push rod 24 to move toward the brake on position while sliding through collet 44. thus, regardless of the presence or absence of pressure applied to collet brake chamber 66, the brakes can always be applied by pressurizing service brake chamber 16.

Figure 3:
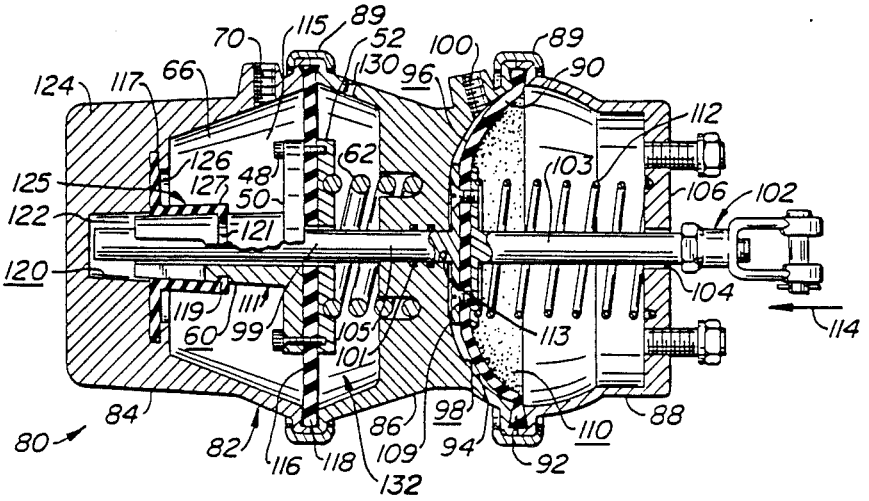
FIG. 3 shows a second embodiment of the air brake of the invention in which the push rod is in the brake off position and the push rod is free.
Figure 4:
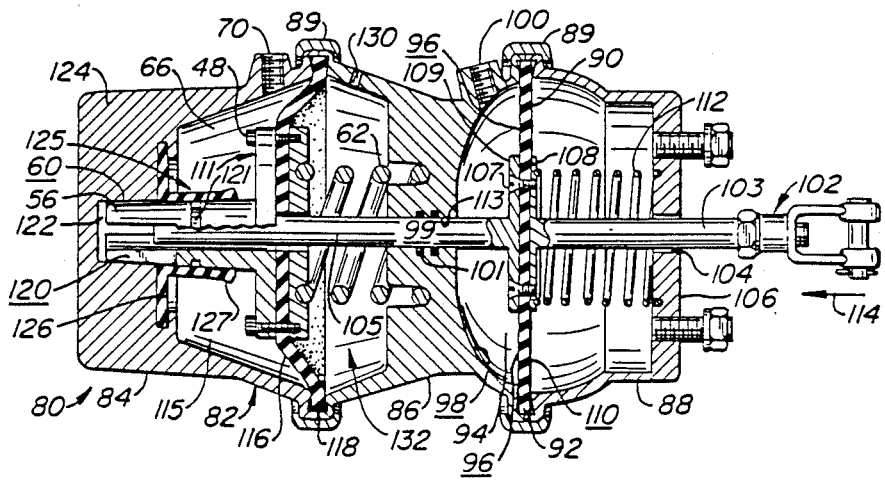
FIG. 4 shows the air brake of FIG. 3 with the push rod in the brake on position and the push rod locked.

Turning now to FIGS. 3 and 4, a second embodiment of the air brake of the invention is shown. Air brake 80 includes a housing 82 comprising first, second and third housing portions 84, 86 and 88 secured to one another by clamps 89. A servce brake diaphragm 90 is mounted between second and third housing portions 86, 88 at its peripheral edge 92 to define a service brake chamber 94 between a forward surface 96 of diaphragm 90 and an opposed end surface 98 of second housing portion 86. Pressurized air is introduced into chamber 94 through a service brake port 100. Port 100 is connected to the vehicle's service brake application line, typically through an exhaust valve for more responsive operation.

A push rod 102 is mounted partially within third housing portion 88 through an opening 104 in an end wall 106 of third portion 88. Push rod 102 includes first and second portions 103 and 105 secured to one another on either side of diaphragm 90 by screws 107. First portion 103 of push rod 102, like push rod 24 of the embodiment of FIG. 1, has an enlarged end 108 which rests against a surface 110 of diaphragm 90. Second portion 105 has an enlarged end 109 resting against surface 96 of diaphragm 90 and includes an elongate rod 99 which passes through a bore 113 in portion 86. O-rings 101 are mounted within bore 113 to contact rod 99 to prevent air from leaking from chamber 94 through bore 113. A return spring 112 biases push rod 1023 in the direction of arrow 114, that is towards the brake off position of FIG. 3. Pressurization of chamber 94 forces push rod 102 in the direction opposite arrow 114 to the brake applying or brake on position of FIG. 4.

A collet brake diaphragm 116 is mounted between first and second housing portions 84, 86 at its peripheral edge 118 to partially define a collet brake chamber 115. As can be seen by reference to FIG. 1, air brake 80 and air brake 2 both mount generally similar collets 44, 111 to their respective collet brake diaphragms 40, 116. The only difference is that a groove 121 is formed in the outer surface 60 of collet 111. Elements having the same reference numerals as the embodiment of FIG. 1, such as mounting ring 52 and locking spring 62, are the same and will not be described again.

A seal 125 is mounted about collet 111 and includes an annular lip portion 126 and a cylindrical portion 127. The periphery of annular lip portion 126 is housed within an annular opening 117 in first housing portion 84 so the screws 74 of the embodiment of FIG. 1 are not needed. Also, sealing bead 119 extends inwardly from an end of cylindrical portion 78. Bead 119 fits within complementary groove 121 formed in collet 111. A bleed hole 130 is formed through second housing portion 86 to vent a region 132 to atmosphere. Pressurization of collet brake chamber 115 presses annular portion 126 against housing portion 84 and cylindrical portion 127 against collet 111 thereby sealing chamber 115. This configuration, which eliminates the need for fasteners, aids the assembly of brake 80.

Outer surface 60 of collet 111 engages a conical surface 120 of a conical opening 122 formed in one end of first housing portion 84. Collet brake locking spring 62 biases collet 111 in tee direction of arrow 114 so that the outer surface 60 of fingers 56 press against conical surface 120 to force the fingers against a second portion 105 of push rod 102.

Air brake 80 operates in a manner similar to air brake 2. Although the embodiment of FIGS. 3 and 4 appears to be somewhat more complicated than that of FIGS. 1 and 2, it has the advantage that the effective column length of push rod 102 is shorter than that of push rod 24, thus reducing any tendency for the push rod to buckle. However, buckling is minimized in the embodiment of FIG. 1 by the guidance provided by push rod 24 passing through collet 44. Also, the physical size of air brake 80 to the left of O-rings 101 can be made smaller than shown since the force required to secure collet 111 is much less than that required to drive push rod 102. Doing so reduces the size, cost and weight of brake 80. The lowered weight is important since it reduces the cantilever stresses on brake 80.

Figure 5:
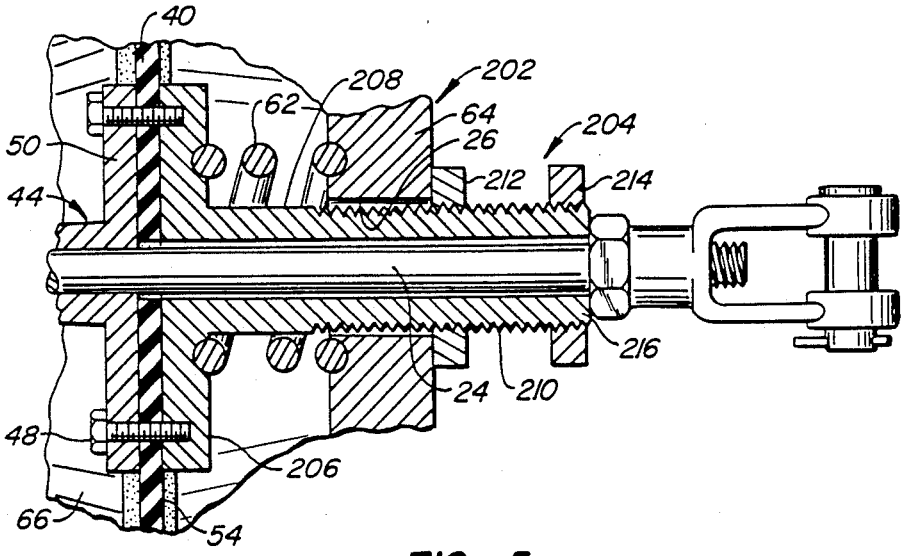
FIGS. 5 and 6 are cross-sectional views of portions of the air brakes of FIGS. 1 and 3 modified to permit a user to prevent the leftward movement of the collet.

Turning now to FIG. 5, a portion of a modified air brake 202 is shown. Air brake 202 is similar to air brake 2 of FIG. 1 with the exception of mounting ring 52 which has been replaced by combination mounting ring and collet deactuator 204. Deactuator 204 includes a face plate 206 mounted against diaphragm 40 and a tubular portion 208 extending about push rod 24 and through opening 26 in end 64. Portion 208 includes a threaded end 210 on which nuts 212, 214 are mounted. Nut 214 is staked in place at the outer end 216 of tubular portion 208. Nut 212 can be maniulated by the user to draw deactuator 204 to the right and against spring 62 as shown in FIG. 5. This prevents locking collet 44 from moving to the left and engaging conical opening 31 so to effectively deactuate the collet braking portion of air brake 202. The user can therefore release the brakes kept applied by theengagement of collet 44 by driving nut 212 against end 654 until collet 44 disengages from opening 31, thus releasing push rod 24. This permits one to release collet 44 from push rod 24 while the vehicle is operating regardless of the pressure within collet brake chamber 66. Normal operation is achieved by rotating nut 212 against nut 214 to allow deactuator 204 to freely move through opening 26 with the flexing of diaphragm 40.

Figure 6:
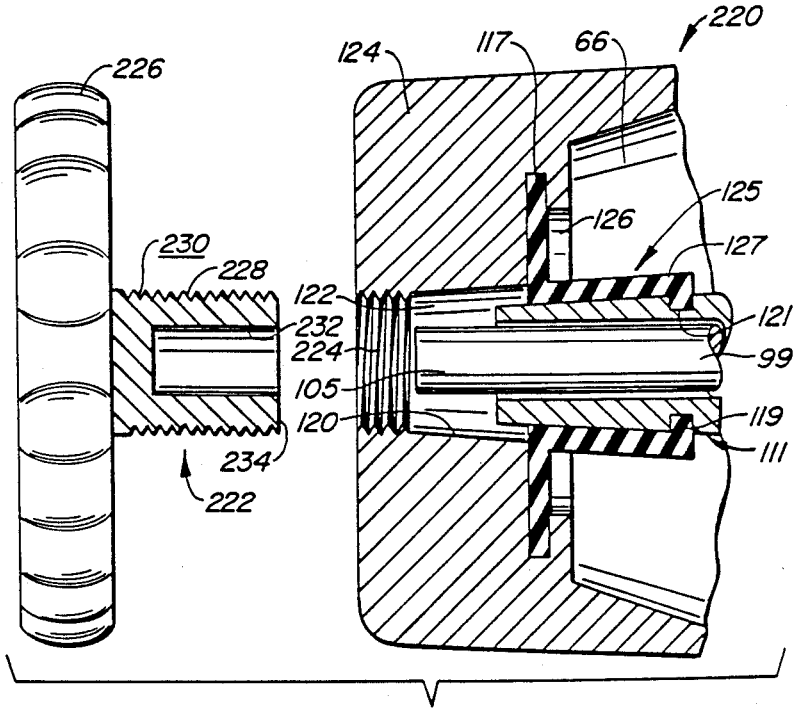

At FIG. 6 a portion of an air brake 220 is shown. Air brake 220 is similar to air brake 80 of FIG. 3 but includes a deactuator 222 and a threaded bore 224. Deactuator 222 includes a handle 226 and an elongate member 228 having a threaded outer surface 230 sized to engage threaded bore 224. Member 228 includes a bore 232 extending from its distal end 234 and sized to loosely surround second portion 105 of push rod 99 when deactuator 222 is secured within bore 224. To keep collet 111 from moving to the left and engaging conical opening 122, the user threads member 228 into bore 224 which causes portion 105 of push rod 99 to enter bore 232 and distal end 234 to engage the distal edge of collet 111. This effectively deactuates the collet brake portion of air brake 220 by keeping collet 111 from moving to the left and engaging conical surface 120. Deactuator 222 is normally not mounted to air brake 220. Rather, deactuator 222 is kept elsewhere, such as in the cab or a toolbox, for use when needed.

Figure 7:
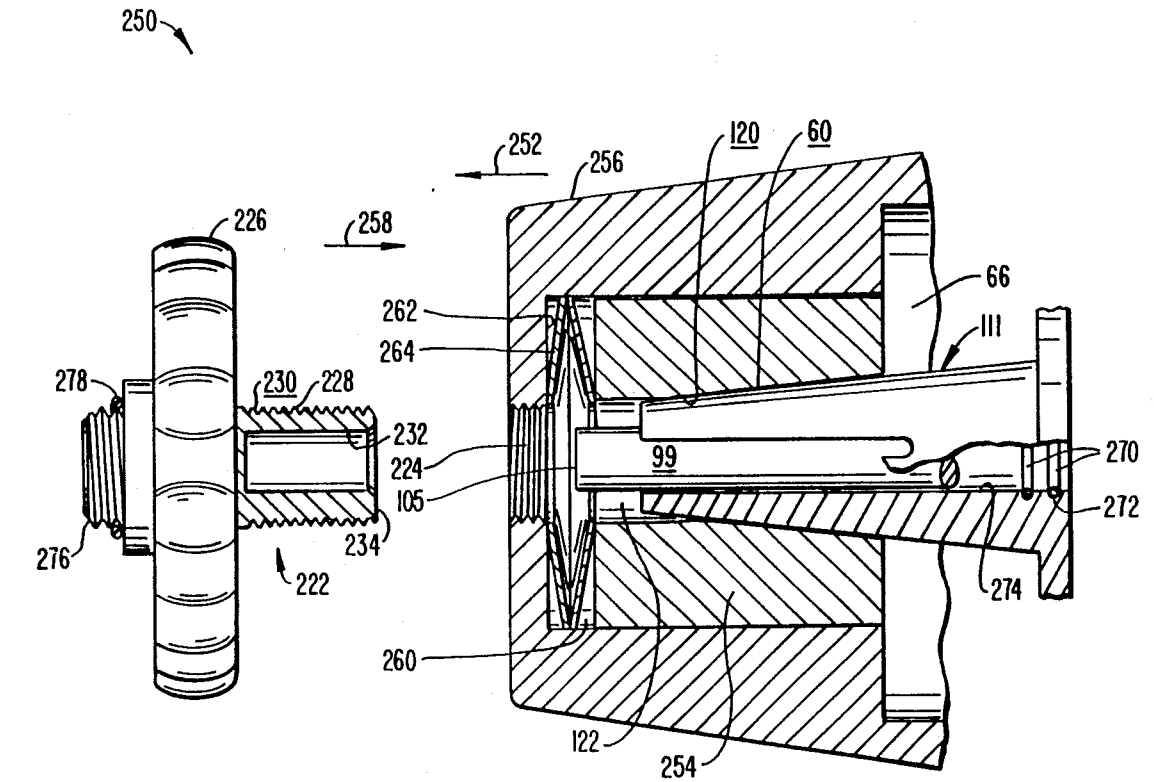
FIG. 7 is a cross-sectional view of an air brake similar to that of FIG. 6 but modified to relieve excessive force on a brake drum.

Referring now to FIG. 7, a portion of an air brake 250, similar to air brake 220 of FIG. 6, is shown with like elements having like reference numerals. Air brake 250, however, permits excessive force on a cooling brake drum to be reduced by permitting push rod 99 to move axially in a brake off direction 252 thus relieving the excessive force on the brake drum. This is accomplished in the following manner.

Conical surface 120, which defines conical opening 122, is formed within a collet hole portion 254 of housing 256 so to be movable axially within a reqion 260 in brake on direction 258 and brake off direction 252. Region 260 has a back wall 262 against which a pair of Belleview springs 264 are positioned. Belleview springs 264 are quite stiff and are used to axially position collet hole portion 254 under the influence of collet 111. Since Belleview springs 264 are quite stiff, normally the axial force exerted on collet hole portion 254 by spring 62 through collet 111 is not sufficient to cause any substantial deflection of the Belleview springs.

If the brakes are applied and locked into place (by pressurizing service brake chamber 94, see FIG. 4, and depressurizing collet brake chamber 115) when the brakes are hot, as the brake drums cool, the brake drums tend to contract thus increasing the force on push rod portion 99. This increased force is transferred from push rod 99 through collet 111 to collet hole portion 54 and finally to Belleview springs 264. If the force is sufficiently great, Belleview springs 264 deflect permitting collet hole portion 254 to move in the brake off direction 252 which permits push rod 99 to also move in brake off direction 252. This releases the brakes a small amount thus reducing the force on the brake drum to help prevent damage to the brake drum.

Air Brake 250 is further modified by the way in which air in chamber 66 is prevented from escaping. First, a pair of O-rings 270 are positioned in grooves 272 formed in the central bore 274 of collet 111 to prevent air leakage between push rod 99 and collet 111. Second, deactuator 222 includes short threads 276 which permit the deactuator to be mounted to threaded bore 224 of each air brake 250 during normal use; doing so seals the bore through the compression of O-ring 278 against housing 256. This arrangment eliminates the need for seal 125 as used in the embodiments of FIGS. 4 and 6.

Modification and variation can be made to the disclosed embodiments without departing from the subject of the invention as defined by the following claims. For example, either or both of the tapered collet and collet hole may have a variable rate of taper rather than the constant rate of taper shown.

What is claimed is:

1. A pressurized fluid actuated brake comprising:

a brake housing defining a service brake chamber and a collet brake chamber;

a push rod mounted to the housing for movement in brake on and brake off axial directions towards brake on and brake off positions;

means, including a service brake diaphragm operably coupled to the push rod and responsive to the presence of a pressurized fluid within the service brake chamber, for driving the push rod towards the brake on position when the service brake chamber is at a first pressurized state; and collet means, operably coupled to the push rod and responsive to the presence of a pressurized fluid within the collet brake chamber, for selectively restricting movement of the push rod towards the brake off position, said push rod restricting means including:

a collet having a bore and a radially deflectable portion surrounding at least a portion of the bore, said radially deflectable portion including an external surface;

said housing defining an axially movable collet bore portion having an internal surface sized and positioned for mating engagement with said external surface, at least one of said internal and external surfaces being tapered;

a collet brake diaphragm partially defining the collet brake chamber;

means for mounting the collet to the collet brake diaphragm for movement of the collet in response to the presence of pressurized fluid within the collet brake chamber so to bias said collet away from said collet bore portion to disengage said external and internal surfaces when the collet brake chamber is at a second pressurized state;

said push rod including a movement limited bar partially housed within said collet bore portion and sized for complementary sliding engagement within the collet bore portion;

spring means for driving the collect into the collet bore portion when said collect brake chamber is in a third pressurized state to lock the movement limiting bar in place thereby restricting movement of the push rod towards the brake off condition; and means for axially biasing the collect bore portion in the brake on axial direction, whereby the collect moves the collet bore portion in the brake off axial direction when an excessive force is applied to the push rod so to reduce such excessive force on the push rod.

* * * * *